(12) United States Patent
Natanson et al.

(10) Patent No.: US 6,633,542 B1
(45) Date of Patent: Oct. 14, 2003

(54) METHOD OF ESTABLISHING A FLOW IN AN ATM BASED MPOA NETWORK

(75) Inventors: Sarit Shani Natanson, Tel Aviv (IL); Benny Gershon, Rehovot (IL); Lior Katzri, Givaataim (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/474,686

(22) Filed: Dec. 29, 1999

(51) Int. Cl.$^7$ .............................................. H04L 12/28
(52) U.S. Cl. ...................................... 370/235; 709/228
(58) Field of Search ............................... 370/230.1, 351, 370/235, 395.5, 395.52, 395.53; 709/218, 224, 228

(56) References Cited

U.S. PATENT DOCUMENTS

| | | | |
|---|---|---|---|
| 5,583,996 A | * 12/1996 | Tsuchiya | 709/218 |
| 5,854,899 A | * 12/1998 | Callon et al. | 709/238 |
| 6,021,263 A | * 2/2000 | Kujoory et al. | 709/232 |
| 6,172,991 B1 | * 1/2001 | Mori | 370/474 |
| 6,275,493 B1 | * 8/2001 | Morris et al. | 370/395.4 |
| 6,279,035 B1 | * 8/2001 | Brown et al. | 709/224 |
| 6,363,072 B1 | * 3/2002 | Furuichi | 370/395.52 |
| 6,385,170 B1 | * 5/2002 | Chiu et al. | 370/235 |
| 6,421,321 B1 | * 7/2002 | Sakagawa et al. | 370/238.1 |
| 6,452,921 B1 | * 9/2002 | Alexander, Jr. et al. | 370/351 |
| 6,504,819 B2 | * 1/2003 | Fowler et al. | 370/230 |

OTHER PUBLICATIONS

Che MPOA flow classification design and Analysis. INFOCOM '99, IEEE, V.3, Mar. 21–25, 1999, pp. 1497–1504.*
CISCO IOS Switching Services Configuration Guide, LAN Emulation Overview, pp. XC–59–65.
LAN Emulation Over ATM Version 2—LUNI Specification—Letter Ballot, AF–LANE–0084.000, pp. 25–26, 29–33, 88–101.
AF–MPOA–0087.000, MPOA Version 1, pp. 56–63.

* cited by examiner

Primary Examiner—Hassan Kizou
Assistant Examiner—D Levitan
(74) Attorney, Agent, or Firm—Howard Zaretsky (57) ABSTRACT

A method of controlling the route used for a flow in an environment comprising a default routing path and a shortcut path in an MPOA enabled ATM based network. A data field is added to the Ingress Cache table in the Ingress MPOA Client (I-MPC) to indicate whether the flow is to be routed through an MPOA shortcut towards the Egress MPOA Client (E-MPC) or is to be routed through the default path towards the Ingress MPOA Server (I-MPS). A first embodiment comprises a method of controlling the routing of a data flow from a source to a destination for security purposes. A second embodiment comprises a method of load sharing a plurality of data flows. A third embodiment comprises a method of learning about past MPOA resolution successes and failures and utilizing past establishment history to bypass the MPOA resolution process.

23 Claims, 8 Drawing Sheets

INGRESS MPC CACHE TABLE

KEYS:
- MPS CONTROL ATM ADDRESS — 42
- INTERNETWORK LAYER DESTINATION ADDRESS — 44

CONTENTS:
- DESTINATION ATM ADDRESS OR VCC — 46
- ENCAPSULATION INFORMATION — 48
- OTHER INFORMATION NEEDED FOR CONTROL — 49

INGRESS MPC CACHE TABLE

KEYS — 52

CONTENTS:
- 54
- FLOW ROUTE — 56

METHOD OF ESTABLISHING A FLOW IN AN ATM BASED MPOA NETWORK

FIELD OF THE INVENTION

The present invention relates generally to data communication systems and more particularly, relates to a method of optionally establishing a flow over a default routing path or a shortcut path in MPOA enabled ATM based networks.

BACKGROUND OF THE INVENTION

Multi-Protocol Over ATM (MPOA)

The majority of networks, e.g., IP networks, are constructed from a plurality of nodes grouped together to form one or more subnets. Subnets are often built using various LAN technologies, with Ethernet and Token Ring being the most popular. Nodes in different subnets cannot normally communicate with each other. A router permits a node in one subnet to communicate with a node on a different subnet. Most internetwork layer protocols utilize routers to permit communications across subnet boundaries.

LAN Emulation (LE), as defined by the ATM Forum, provides Emulated LANs (ELANS) which emulate the services of Ethernet and Token Ring LANs across an ATM network. LE allows a subnet to be bridged across an ATM/LAN boundary. LE permits a single ATM network to support multiple ELANs. Utilizing ELANs, internetwork layer protocols can operate over an ATM network in essentially the same way they operate over Ethernet or Token Ring LANs. Although LE provides an effective means for bridging intra-subnet data across an ATM network, internetwork traffic still must be forwarded through routers.

The Next Hop Resolution Protocol (NHRP) and Multicast Address Resolution Server (MARS) protocols defined by the Internetworking Over NBMA (ION) Working Group, also permit internetwork layer protocols to operate over an ATM network. These protocols permit the ATM network to be divided into multiple ION subnets, also known as Logical IP Subnets (LISs) or Local Access Groups (LAGs). Routers are required, however, to interconnect these subnets. NHRP, however, allows intermediate routers to be bypassed on the data path. NHRP provides an extended address resolution protocol that permits Next Hop Clients (NHCs) to send queries between different subnets. Queries are propagated by Next Hop Servers (NHSs) along the routed path as determined by standard routing protocols. This enables the establishment of ATM VCCs across subnet boundaries, permitting inter-subnet communication without requiring routers in the data path.

Notwithstanding the availability of LANE and NHRP, a common situation exists wherein communicating LAN devices are behind LANE edge devices. The use of Multi-Protocol Over ATM (MPOA) permits these edge devices to perform internetwork layer forwarding and establish direct communications without requiring that the LANE edge devices comprise full function routers.

MPOA functions to provide an efficient transfer of inter-subnet unicast data in a LE environment. MPOA integrates LE and NHRP so as to preserve the benefits of LE, while allowing inter-subnet, internetwork layer protocol communication over ATM VCCs without requiring routers in the data path. MPOA provides a framework for effectively synthesizing bridging and routing with ATM in an environment of diverse protocols and network technologies. This framework provides a unified paradigm for overlaying internetwork layer protocols on ATM. MPOA is capable of using both routing and bridging information to select a shortcut through the ATM cloud to the egress MPC.

MPOA permits the physical separation of internetwork layer route calculation and forwarding, a technique known as virtual routing. This separation has the advantages of: (1) allowing efficient inter-subnet communications; (2) increasing manageability by decreasing the number of devices that must be configured to perform internetwork layer route calculation; (3) increases scalability by reducing the number of devices participating in internetwork layer route calculation; and (4) reduces the complexity of edge devices by eliminating the need to perform internetwork layer route calculation.

MPOA provides MPOA Clients (MPCs) and MPOA Servers (MPSs) and defines the protocols that are required for MPCs and MPSs to communicate. MPCs function to issue queries for shortcut ATM addresses and/to receive replies from the MPS using these protocols. MPOA also functions to ensure interoperability with the existing infrastructure of routers. MPOA Servers utilize routers that run standard internetwork layer routing protocols e.g., Open Shortest Path First (OSPF), providing a smooth integration with existing networks.

The primary function of the MPC is to source and sink internetwork shortcuts. The MPC performs internetwork layer forwarding but does not run internetwork layer routing protocols. The MPC detects ingress flows of packets that are forwarded over an ELAN to a router that comprises an MPS. When it recognizes a flow that could benefit from a shortcut that bypasses the routed path, it uses an NHRP based query/response protocol to request the information required to establish a shortcut to the destination. If a shortcut is available, the MPC caches the information in its ingress cache, sets up a shortcut VCC and forwards frames for the destination over the shortcut.

The MPC receives egress internetwork data frames from other MPCs to be forwarded to its local interface and/or users. For frames received over a shortcut, the MPC adds the appropriate encapsulation/header and forwards them to the higher layers. The encapsulation is provided to the MPC by the egress MPS and stored in the egress cache in the MPC. Note that an MPC is able to service multiple LECs and communicates with multiple MPSs. In addition, there may be multiple MPCs in an edge device. A given LEC, however, may be associated with only a single MPC.

An MPS is the logical component of a router that provides internetwork layer forwarding information to the MPCs. It comprises a full NHRP implementation with extensions as defined in the ATM Forum Multi-Protocol Over ATM Specification Version 1.0, AF-MPOA-0087.000, July 1997, incorporated herein in its entirety by reference. The MPS interacts with its local NHS and routing functions to reply to MPOA queries from ingress MPCs and provides encapsulation information to egress MPCs. Note that an MPS converts between MPOA requests and replies and NHRP requests and replies on behalf of MPCs. In addition, there may be multiple MPSs in a router. A given LEC, however, may be associated with only a single MPS.

An MPOA solution generally comprises a plurality of MPOA control flows and MPOA data flows. All control and data flows are carried over ATM VCCs. Control flows use MPOA control VCCs. Note that these VCCs can be used for other protocols (e.g., LE, etc.) as well in a multiplexed mode. Data flows, on the other hand, are carried over either LE VCCs (i.e., the default path) or over shortcut VCCs established via MPOA.

MPOA performs the following operations: configuration, discovery, target resolution, connection management and data transfer. Configuration is obtaining the appropriate configuration information in both MPC and MPS. Normally, MPOA components receive configuration information from the LECS. Discovery involves MPCs and MPSs learning of each other's existence. MPOA components automatically discover each other using extensions to the LE LE_ARP protocol that carry the MPOA device type (i.e., MPS, MPC) and ATM address. This information may change and must be periodically verified and updated if necessary. An MPOA device type TLV can be included in the following LE messages: LE_REGISTER request and response, LE_ARP request and response and targetless LE_ARP request.

Target resolution denotes the determining of the mapping of a target to an egress ATM address, an optional tag and a set of parameters used to setup a shortcut to forward packets across subnet boundaries.

Connection management entails creating, maintaining and terminating VCCs for the purpose of transferring control information and data. MPOA components establish VCCs between each other as necessary to transfer control and data messages over the ATM network. The goal of MPOA is the efficient transfer of unicast data within the ATM cloud. Unicast data flow can comprise either the default flow or the shortcut flow. The default flow follows the routed path over the ATM network whereby the MPOA edge device functions as a layer 2 bridge. Shortcuts are established using the MPOA target resolution and cache management mechanisms. When an MPC has an internetwork protocol packet to send for which it has a shortcut, the MPOA edge device functions as an internetwork level forwarder and sends the packet over the shortcut.

Figure 1:
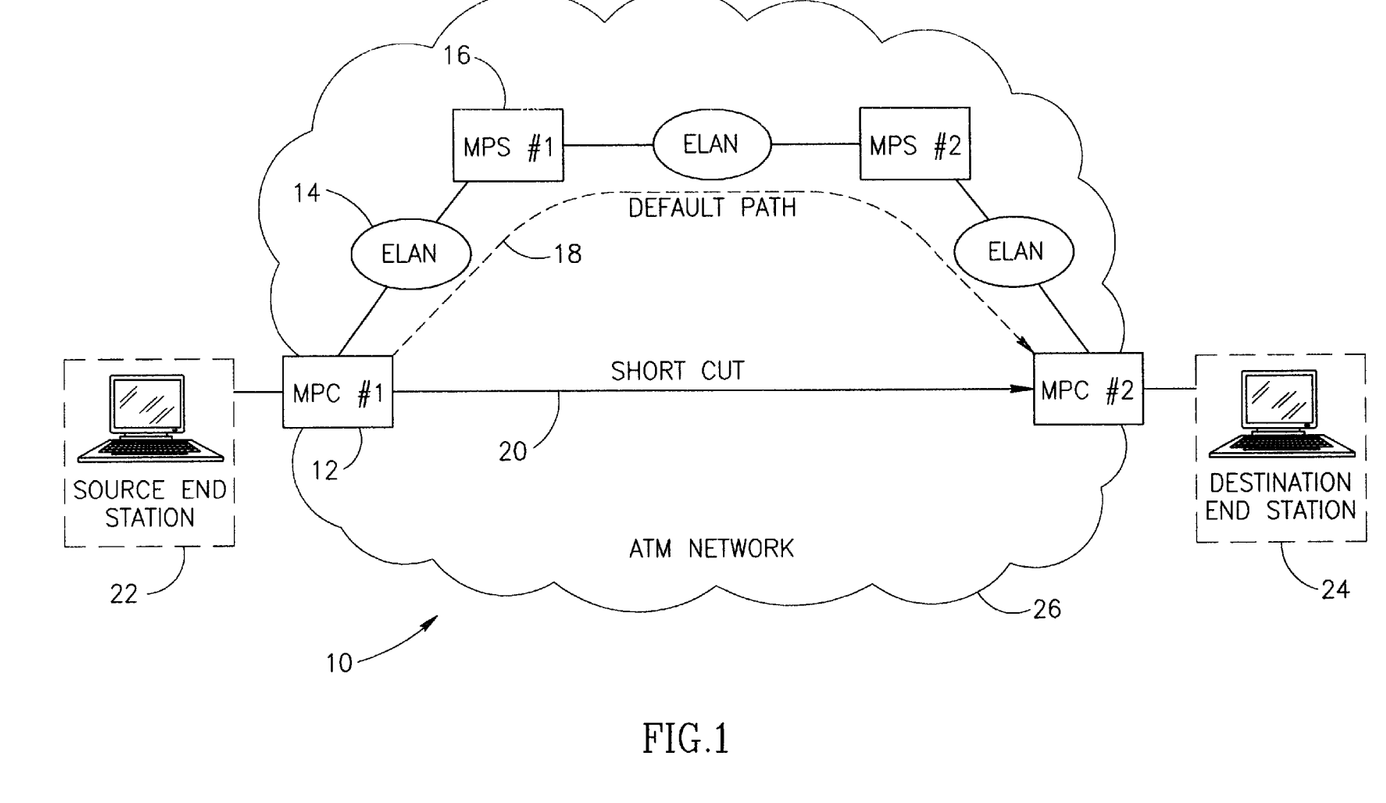
FIG. 1 is a block diagram illustrating an example MPOA network comprising a plurality of MPSs and MPCs.

A block diagram illustrating an example MPOA network comprising a plurality of MPSs and MPCs wherein the default path and shortcut path are highlighted, is shown in FIG. 1. The network, generally referenced 10, comprises a source end station 22, a plurality of MPCs 12, labeled MPC #1 and #2, a plurality of ELANs 14, a plurality of MPSs 16, labeled MPS #1 and #2, a destination end station 24 and an ATM cloud 26. The default path is represented by dashed arrow 18 while the shortcut is represented by solid arrow 20.

The ingress MPC (e.g., MPC #1) learns the MAC addresses of the MPSs (e.g., MPS #1) attached to its ELANs from the device type TLV in LE_ARP responses. The MPC performs flow detection, based on internetwork layer destination addresses, on packets destined for these learned MAC addresses. Although default forwarding is via routers, if an MPC becomes aware of a particular traffic flow that might benefit from a shortcut, the ingress MPC then determines the ATM address associated with the egress device. The ingress MPC sends an MPOA Resolution Request message to the appropriate ingress MPS in order to obtain the ATM address for a shortcut. The MPS resolves the MPOA Resolution Request and a reply is returned to the ingress MPC containing an ATM of the egress device.

The ingress MPS processes MPOA Resolution Requests sent by local MPCs. It may answer the request if the destination is local or it may re-originate the request along the routed path through its local NHS.

When an NHRP Resolution Request targeted for a local MPC arrives at the egress MPS serving that MPC, the egress MPS sources an MPOA Cache Imposition Request and sends it to the egress MPC. This request is part of the cache management protocol that serves to provide encapsulation and state maintenance information needed by the egress MPC (e.g., MPC #2 ). The corresponding reply provides status, address and ingress tagging information needed by the egress MPS (e.g., MPS #2 ) in forming the NHRP Resolution Reply.

The egress MPC (e.g., MPC #2 ) checks to determine whether it has sufficient resources to maintain the cache entry and potentially receive a new VCC and replies accordingly. The Egress MPS sends an MPOA Cache Imposition Reply for every MPOA Cache Imposition Request.

With reference to FIG. 1, a packet generated by the source end station enters the MPOA system at the ingress MPC (MPC #1 ). The MPC creates a new cache entry for new flows that are detected. If a valid shortcut does not already exist for the flow, the MPC begins counting frames. When a threshold is exceeded, a MPOA Resolution Request is sent to the MPS to request a shortcut. By default, the packet is bridged via LE to a router. If the packet is not to follow the default path, i.e., it is part of a flow for which a shortcut has previously been established, it is send via the shortcut. If the packet comprises a new flow, each packet sent to an MPS is logged and counted (by internetwork layer destination address) as it is being sent via LE. When a threshold (a number of packets within a given period of time) is exceeded, the MPC sends an MPOA Resolution Request to obtain the ATM address to be used for establishing a shortcut to a particular downstream element (e.g., an egress MPC).

When the packet arrives at the egress MPC (e.g., MPC #2) via the shortcut, it is examined and either a matching egress cache entry is found or the packet is dropped and an error is indicated. If a match is found, the packet is encapsulated using the information in the egress cache and then forwarded to a higher layer.

An ingress MPC examines all packets destined for MAC addresses that belong to MPSs. When it detects a packet destined for an internetwork layer destination for which it does not already have a cache entry, it creates a new ingress cache entry for that internetwork layer destination. When the MPC detects a flow to a given internetwork layer destination, it sends an MPOA Resolution Request. When the MPOA Resolution Reply is received, the internetwork layer destination address, destination ATM address, source holding time and MPOA egress cache tag extension are used to complete the ingress cache entry.

Any existing VCC may be used for data forwarding if its source and destination ATM addresses match those in the MPOA Resolution Reply and the VCC signaling parameters are suitable. Otherwise, the MPC must signal the creation of a new VCC before the shortcut can be used. Note that ingress cache entries are aged using the source holding time and can be withdrawn in the ingress MPS or deleted by the ingress MPC at any time for local reasons.

Figure 2:
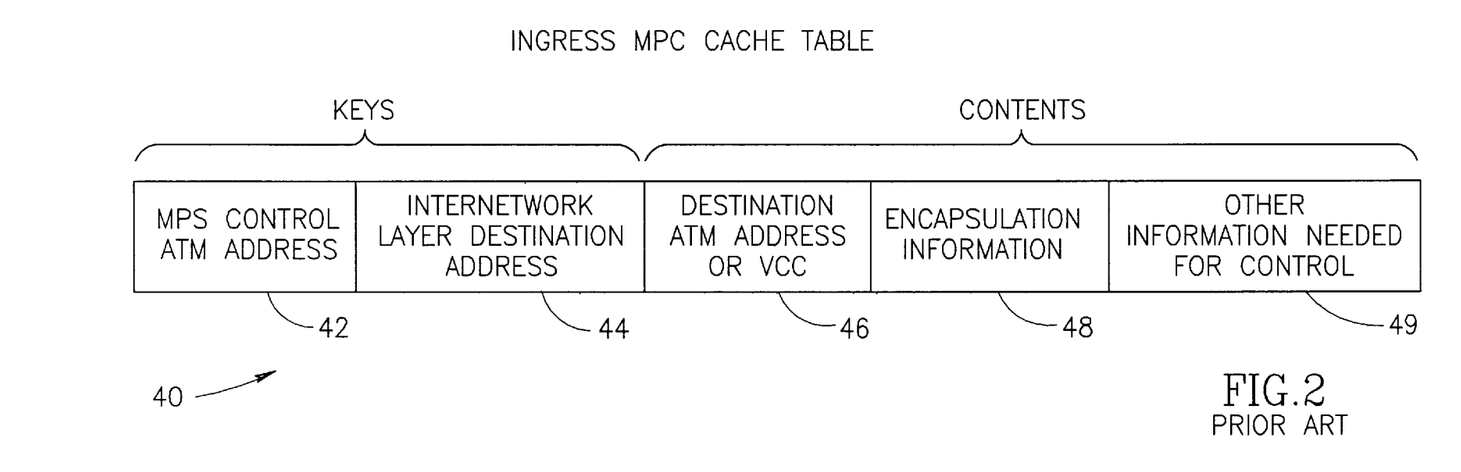
FIG. 2 is a diagram illustrating the structure of the prior art ingress MPOA Client cache table.

A diagram illustrating the structure of the prior art ingress MPOA Client cache table is shown in FIG. 2. The table, generally referenced 40, comprises an MPS control ATM address 42, internetwork layer destination address 44, destination ATM address or VCC 46, encapsulation information 48 and any other information 49 needed for control purposes, e.g., flow count and holding time.

As described hereinabove, MPOA is a mechanism having a client/server architecture wherein MPCs and MPSs are connected via LE. In its ingress role, an MPC detects flows of packets that are being forwarded over an ELAN to a router that comprises an MPS. When it recognizes a flow that can benefit from a shortcut that bypasses the routed path, it uses an NHRP based query-response protocol to request information necessary to establish the shortcut to the destination.

Given that the destination of the flow is served by an egress MPC, a successful handling of the MPOA protocol would result in either establishing a new shortcut VCC or utilize an existing VCC. This VCC connects the ingress MPC and the egress MPC. In the future, packets are forwarded over the shortcut, bypassing the routers on the original traffic path.

There are, however, several scenarios whereby the end result is not an active data shortcut VCC. Several example possible reasons for this include:

1. The destination device is not served by an MPC, thus there is no egress MPC device to which a shortcut can be established.
2. An MPOA device that participates in the MPOA protocol resolution suffers from lack of resources, resulting in failure responses.
3. An MPS device that participates in the MPOA protocol resolution, locally decides not to allow a data shortcut VCC. Such local decisions may result from security reasons, for example where an MPS decides that it wishes to inspect traffic destined to a particular IP destination.

Further, the ingress MPC stores relevant information from successful attempts at creating shortcuts in its ingress cache. Data related to unsuccessful attempts at creating a shortcut, however, are not stored in the ingress MPC according to the MPOA standard. A failure to create a shortcut likely results in a new query (due to other flows) which places a substantial load on the network.

Still further, the MPOA specification does not provide a mechanism for an MPC to decide, based on loading consideration, whether to direct a flow over the default path or via the shortcut path. In some cases, depending on the congestion state of both the default path and the shortcut path, it may be more desirable to forward packets over the default path rather than over the shortcut VCC, notwithstanding the fact that a shortcut path was previously established. Further, no mechanism for assigning priorities to flows is provided in the MPOA specification.

SUMMARY OF THE INVENTION

The present invention is a method of controlling the route used for a flow in an environment comprising a default routing path and a shortcut path in an MPOA enabled ATM based network. In accordance with the present invention, a data field is added to the Ingress Cache table in the Ingress MPOA/Client (I-MPC). The data field indicates whether the flow is to be routed through an MPOA shortcut towards the Egress MPOA Client(E-MPC) or should be routed through the default path towards the Ingress MPOA Server (I-MPS). The present invention presents three example application embodiments illustrating the application of the invention to various networking functions.

The first example embodiment comprises method of controlling the routing of a data flow from a source to a destination for security purposes. This example embodiment is well suited for security applications where it is desirable to decide on a flow-by-flow basis whether a particular flow should be routed over the default path or the shortcut path. In some situations, it is desirable to have one or more of the MPOA Servers (i.e., routers) along the default path provide one or more security functions. Example of security functions include monitoring flows, filtering the contents of the flows, data probing, security access, security authorization, security verification, etc. Thus, a mechanism for controlling which flows are permitted to be routed over a shortcut path, thus bypassing the MPOA Servers, is provided. A security field(i.e., flow route field) is configured in the ingress cache table to indicate whether the flow should use the default path or in the alternative, can be routed over the shortcut path.

The second example embodiment comprises a method of load sharing a plurality of data flows wherein a portion of the flows are routed over the default path and a portion are routed over the shortcut path. The decision to route over either path is made based on the level of congestion of each path and the value of a priority field assigned to the particular flow. Periodically, the level of congestion on the default path and the shortcut path are re-analyzed and, congestion levels permitting, a flow previously routed over the default path can be re-directed over the shortcut path.

The third example embodiment comprises a method of learning about past MPOA resolution successes and failures and utilizing this establishment history to bypass the time consuming MPOA resolution process. Based on the past history, a current flow is either routed over the default path or the shortcut path. This method avoids the necessity of performing the complete MPOA resolution process only to determine that a shortcut path cannot be established to the destination (i.e., E-MPC). Using the previous history in such a fashion to determine whether or not to use the shortcut or the default path is particularly useful since with some types of failures, receiving one error is an indication that additional are likely to be received.

There is provided in accordance with the present invention, in an Asynchronous Transfer Mode (ATM) based Multiple Protocol Over ATM (MPOA) network running LAN Emulation (LE) and having an ingress MPOA Client (I-MPC), ingress MPOA Server (I-MPS), egress MPS (E-MPS) and an egress MPC (E-MPC), a method of establishing a data flow from a source to a destination, the method comprising the steps of establishing a data path from the source to the destination via a default path established between the I-MPC, the I-MPS, the E-MPS and the E-MPC, establishing a data path from the source to the destination via a shortcut path established directly between the I-MPC and the E-MPC, providing a flow route field for indicating whether the flow is to be routed through the default path or the shortcut path and routing the flow over the default path or the shortcut path in accordance with the contents of the flow route field.

There is also provided in accordance with the present invention, in an Asynchronous Transfer Mode (ATM) based Multiple Protocol Over ATM (MPOA) network running LAN Emulation (LE) and having an ingress MPOA Client (I-MPC), ingress MPOA Server (I-MPS), egress MPS (E-MPS) and an egress MPC (E-MPC), a method of controlling the routing of a data flow from a source to a destination, the method comprising the steps of establishing a data path from the source to the destination via a default path established between the I-MPC, the I-MPS, the E-MPS and the E-MPC, establishing a data path from the source to the destination via a shortcut path established directly between the I-MPC and the E-MPC, providing a security field for indicating whether the flow is permitted to be routed via the shortcut path rather than the default path and routing the flow over the default path or the shortcut path in accordance with the contents of the security field.

There is further provided in accordance with the present invention, in an Asynchronous Transfer Mode (ATM) based Multiple Protocol Over ATM (MPOA) network running LAN Emulation (LE) and having an ingress MPOA Client (I-MPC), ingress MPOA server (I-MPS), egress MPS (E-MPS) and an egress MPC (E-MPC), a method of load sharing a plurality of data flows, the method comprising the steps of establishing a data path from a source to a destination via a default path established between the I-MPC, the I-MPS, E-MPS and the E-MPC, establishing a data path from the source to the destination via a shortcut path established directly between the I-MPC and the E-MPC, providing a flow route field for indicating whether the flow is to be routed over the default path or the shortcut path, providing a flow priority field for indicating the level of priority assigned to the flow, determining whether the flow is to be routed via the default path or the shortcut path in accordance with the level of congestion on the default path and the shortcut path and with the value of the flow priority field associated with the flow and routing over the default path or the shortcut path in accordance with the results of the step of determining.

There is also provided in accordance with the present invention, in an Asynchronous Transfer Mode (ATM) based Multiple Protocol Over ATM (MPOA) network running LAN Emulation (LE) and having an ingress MPOA Client (I-MPC), ingress MPOA Server (I-MPS), egress MPS (E-MPS) and an egress MPC (E-MPC), a method of learning about past MPOA resolution successes and failures, the method comprising the steps of establishing a data path from the source to the destination via a default path established between the I-MPC, the I-MPS, the E-MPS and the E-MPC, establishing a data path from the source to the destination via a shortcut path established directly between the I-MPC and the E-MPC, providing a flow route field for indicating whether the flow is to be routed over the default path or the shortcut path, providing a success field for indicating whether the establishment of an MPOA shortcut route was successful or not for this particular flow, determining whether the current flow is to be routed over the shortcut route or the default route in accordance with the shortcut establishment successes and failures of one or more previous flows and routing the flow over the default path or the shortcut path in accordance with the results of the step of determining.

There is further provided in accordance with the present invention an ingress Multiple Protocol Over ATM (MPOA) Client (I-MPC) device comprising MPC means adapted to implement the client side of the MPOA protocol, an ingress cache table comprising a flow route field for indicating whether a flow is to be routed over a default path or a shortcut path and security means for determining whether a flow is to be routed via the default path or the shortcut path and for setting the flow route field in accordance thereto and means for routing the flow in accordance with the flow route field.

There is still further provided in accordance with the present invention an ingress Multiple Protocol Over ATM (MPOA) Client (I-MPC) device comprising MPC means adapted to implement the client side of the MPOA protocol, an ingress cache table comprising a flow route field for indicating whether a flow is to be routed over a default path or a shortcut path, measurement means for determining the congestion level of the default path and the shortcut path, load sharing means for determining, based on the output of the measurement means, whether a flow is to be routed via the default path or the shortcut path and for setting the flow route field in accordance thereto and means for routing the flow in accordance with the flow route field.

The device further comprises means for re-analyzing the congestion level of the default path and the shortcut path and, if traffic conditions permit, redirecting a flow previously routed over the default path over the shortcut path. The device further comprises means for re-analyzing the congestion level of the default path and the shortcut path and, if traffic conditions permit, redirecting a flow previously routed over the shortcut path over the default path.

There is also provided in accordance with the present invention an ingress Multiple Protocol Over ATM (MPOA) Client (I-MPC) device comprising MPC means adapted to implement the client side of the MPOA protocol, an ingress cache table comprising a flow route field for indicating whether a flow is to be routed over a default path or a shortcut path and a flow priority field for indicating the priority assigned to a flow, measurement means for determining the congestion level of the default path and the shortcut path, load sharing means for determining, based on the output of the measurement means and the value of the flow priority field, whether a flow is to be routed via the default path or the shortcut path and for setting the flow route field in accordance thereto and means for routing the flow in accordance with the flow route field.

In addition, there is provided in accordance with the present invention an ingress Multiple Protocol Over ATM (MPOA) Client (I-MPC) device comprising MPC means adapted to implement the client side of the MPOA protocol, an ingress cache table comprising a flow route field for indicating whether a flow is to be routed over a default path or a shortcut path and an establishment success field for indicating the success or failure of the establishment attempt of a shortcut path, recording means for storing the results of attempts to establish shortcut virtual circuits in the establishment success field of the ingress cache table, search means adapted to search the ingress cache table for similar flows upon the MPC means receiving a new flow, decision means for determining, based on the output of the search means, whether a flow is to be routed via the default path or the shortcut path and for setting the flow route field in accordance thereto and means for routing the flow in accordance with the flow route field.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ARP | Address Resolution Protocol |
| ATM | Asynchronous Transfer Mode |
| CIE | NHRP Client Information Element |
| DDVC | Data Direct Virtual Circuit |
| ELAN | Emulated LAN |
| E-MPC | Egress MPOA Client |
| E-MPS | Egress MPOA Server |
| IETF | Internet Engineering Task Force |
| I-MPC | Ingress MPOA Client |
| I-MPS | Ingress MPOA Server |
| ION | Internetworking Over NBMA |

-continued

| Term | Definition |
| --- | --- |
| IP | Internet Protocol |
| LAG | Local Access Group |
| LAN | Local Area Network |
| LANE | LAN Emulation |
| LE | LAN Emulation |
| LEC | LAN Emulation Client |
| LECS | LAN Emulation Configuration Server |
| LIS | Logical IP Subnet |
| MAC | Media Access Control |
| MARS | Multicast Address Resolution Server |
| MPC | MPOA Client |
| MPOA | Multi-Protocol Over ATM |
| MPS | MPOA Server |
| NBMA | Non-Broadcast Multi-Address |
| NHC | Next Hop Client |
| NHRP | Next Hop Resolution Protocol |
| NHS | Next Hop Server |
| OSPF | OpenShortestPathFirst |
| TLV | Type, Length, Value |
| VCC | Virtual Channel Connection |

The following definitions apply throughout this document.

| Term | Definition |
| --- | --- |
| Control Flow | A bidirectional flow of control messages (e.g., NHRP and MPOA messages) between two MPOA components (i.e., MPS or MPC). |
| Data Flow | A unidirectional flow of packets to a single destination used by an MPOA component. |
| Default Path | The hop by hop path between routers that a packet would travel in the absence of shortcuts, as determined by routing protocols. |
| Edge Device | A physical device capable of bridging packets between one or more LAN interfaces and one or more LAN Emulation Clients. An Edge Device also comprises one or more MPOA Clients permitting it to forward packets across subnet boundaries using an Internetwork protocol. |
| Egress Cache | The collection of Egress Cache Entries in an MPC. |
| Egress Cache Entry | Information describing how Internetwork Layer packets from a particular shortcut are to be encapsulated and forwarded. |
| Flow | A stream of packets between two entities. Multiple flows may be multiplexed over a single VCC. |
| Ingress Cache | The collection of Ingress Cache Entries in an MPC. |
| Ingress Cache Entry | The collection of information dealing with inbound data flows. This information is used to detect flows that may benefit from a shortcut, and once detected, indicates the shortcut VCC to be used and encapsulation information to be used on the frame. |
| Internetwork Layer | The protocols and mechanisms used to communicate across subnet boundaries, e.g., IP, IPv6, IPX, AppleTalk DDP, SNA, etc. |
| MPOA Client | A protocol entity that implements the client side of the MPOA protocol. |
| MPOA Host | A host containing one or more LAN Emulation Clients allowing it to communicate using LAN Emulation. An MPOA Host contains one or more MPOA Clients allowing it to transmit packets across subnet boundaries using an Internetwork Layer protocol. |
| MPOA Server | A protocol entity that implements the server side of the MPOA protocol. |
| Shortcut | An ATM VCC used to forward data packets in lieu of the default routed path. |
| Target | An Internetwork Layer Address to which a shortcut is desired. |

General Description

The present invention is a method of controlling the route used for a flow in an environment comprising a default routing path and a shortcut path in an MPOA enabled ATM based network. The present invention idea method of optionally establishing a flow over a default routing path or a shortcut path in an MPOA enabled ATM based network. In accordance with the present invention, a data field is added to the Ingress Cache table in the Ingress MPOA Client (I-MPC). The data field indicates whether the flow is to be routed through an MPOA shortcut towards the Egress MPOA Client (E-MPC) or should be routed through the default path towards the Ingress MPOA Server (I-MPS).

The present invention presents three example application embodiments illustrating the application of the invention to various networking functions. The first example embodiment comprises a method of controlling the routing of a data flow from a source to a destination for security purposes. The second example embodiment comprises a method of load sharing a plurality of data flows where a portion of the flows are routed over the default path and a portion are routed over the shortcut path. The decision to route over either path is made based on the level of congestion of each path and the value of a priority assigned to the particular flow. The third example embodiment comprises a method of learning about past MPOA resolution successes and failures and utilizing this establishment history to bypass the time consuming MPOA resolution process. Based on the past history, the MPC can decide how to forward a current flow (i.e., either routed over the default path or the shortcut path).

To aid in understanding the principles of the present invention, an example MPOA based ATM network is presented. Note, however, that the example network is presented for illustration purposes only and is not intended to limit the scope of the invention. It will be appreciated that one skilled in the networking arts can adapt the principles of the present invention to numerous other MPOA networks as well.

First Method—Security

Figure 3:
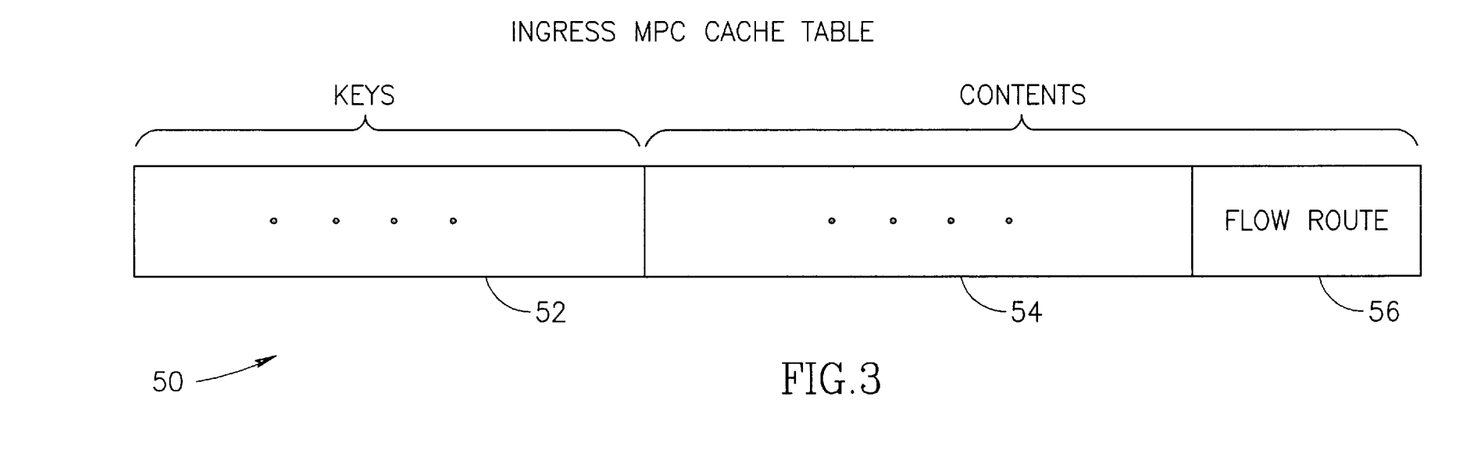
FIG. 3 is a diagram illustrating the structure of the ingress MPOA Client cache table of a first embodiment of the present invention.

A diagram illustrating the structure of the ingress MPOA Client cache table of a first embodiment of the present invention is shown in FIG. 3. The ingress cache table comprises the standard ingress cache table, generally referenced 50, as described in the MPOA standard specification including both key fields 52 and content fields 54 described above in connection with FIG. 2. In addition, a flow route field 56 is added to the table to indicate whether the flow is to be routed over the default path or the shortcut path.

Figure 4:
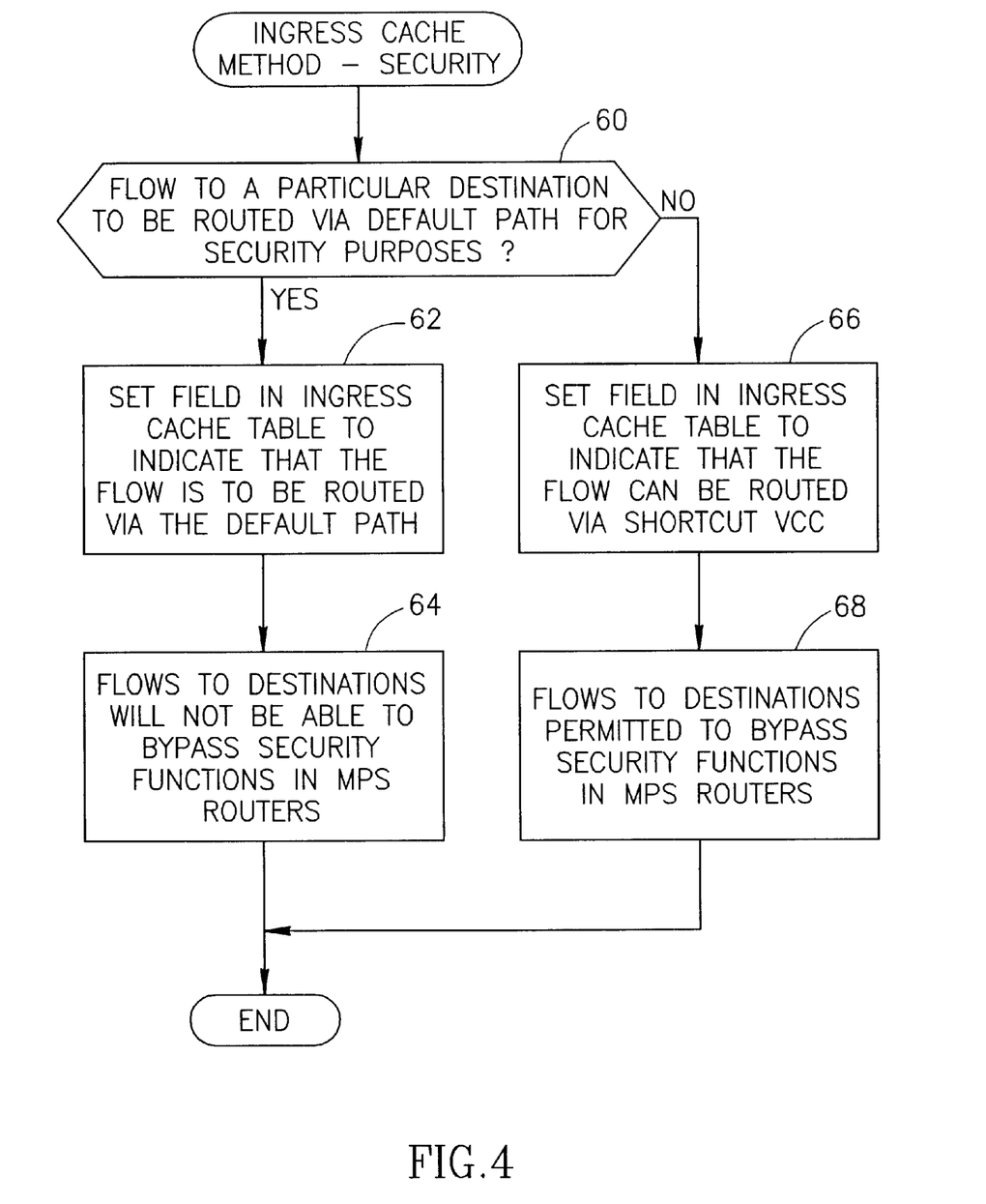
FIG. 4 is a flow diagram illustrating the security ingress cache method of the first embodiment of the present invention.

A flow diagram illustrating the security ingress cache method of the first embodiment of the present invention is shown in FIG. 4. This example embodiment is well suited for security applications wherein it is desirable to decide on a flow by flow basis whether a particular flow should be routed over the default path or the shortcut path. In some situations, one or more of the MPOA Servers (i.e., routers) along the default path provide monitoring functions for monitoring and/or filtering the contents of the flows. Other functions that may be performed by the one or more MPOA Servers along the default path include, but are not limited to, probing, data filtering, security access, security authorization, etc. Routing the flow via the shortcut path would bypass any such security functions performed by one of the MPOA Servers along the default route. Thus, the present invention provides a dynamic mechanism for controlling which flows are permitted to be routed over a shortcut path, thus bypassing the MPOA servers, and which are not.

To control the routing of flows, the ingress cache table is configured with a security field (i.e., flow route field) to indicate whether the flow should always use the default path or in the alternative can be routed over the shortcut path.

With reference to FIGS. 3 and 4, it is first determined whether the particular flow is permitted to be routed over the shortcut path or must be routed over the default path for security purposes (step 60). If the flow is not permitted to be routed over the shortcut path, the security field in the ingress cache table is set to indicate that the flow is to be routed over the default path (step 62). In this case, the flows to destinations will not be able to bypass security functions in MPS routers situated along the default path (step 64).

If the flow is permitted to be routed over the shortcut path, the security field in the ingress cache table is set to indicate that the flow can be routed via the shortcut path (step 66). In this case, the flows to destinations are permitted to bypass security functions in MPS routers situated along the default path (step 68).

Second Method—Load Sharing

Figure 5:
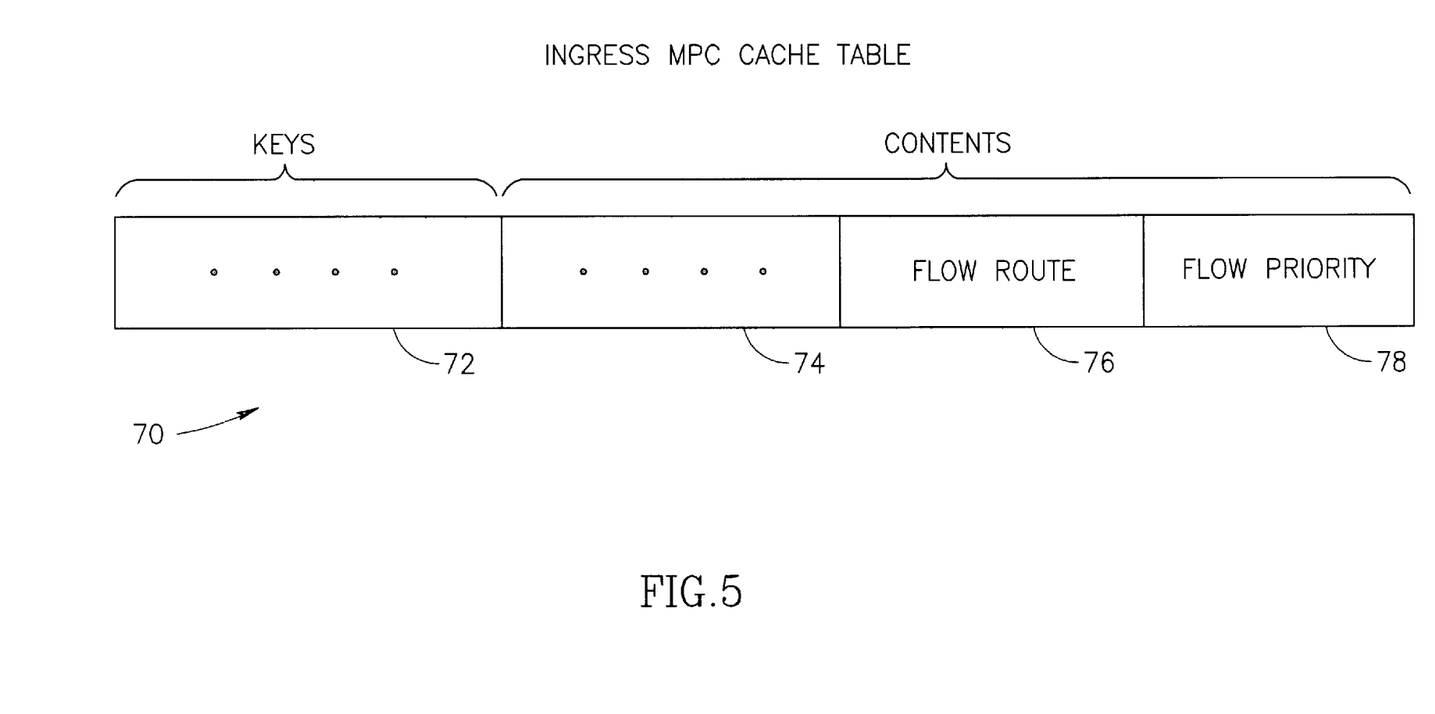
FIG. 5 is a diagram illustrating the structure of the ingress MPOA Client cache table of a second embodiment of the present invention.

A diagram illustrating the structure of the ingress MPOA Client cache table of a second embodiment of the present invention is shown in FIG. 5. The ingress cache table comprises the standard ingress cache table, generally referenced 70, as described in the MPOA standard specification including both key fields 72 and content fields 74 described above in connection with FIG. 2. In addition, a flow route field 76 and flow priority field 78 are added to the table. The flow route field functions to indicate whether the flow is to be routed over the default path or the shortcut path and the flow priority field functions to indicate the priority level assigned to the flow. The flow priority field is optional but is useful in applications where it is desirable to prioritize flows.

Figure 6:
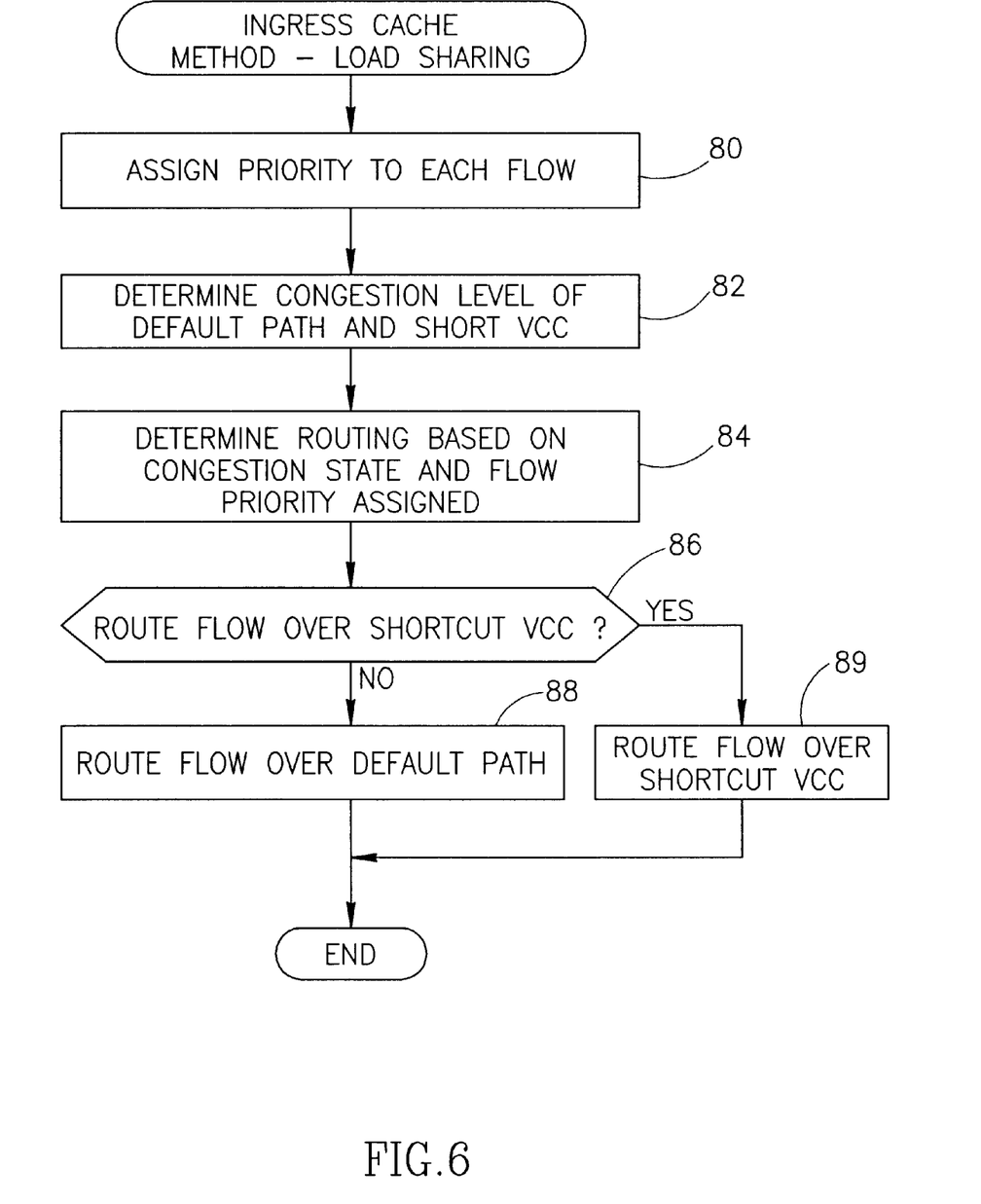
FIG. 6 is a flow diagram illustrating the load sharing ingress cache method of the second embodiment of the present invention.

A flow diagram illustrating the load sharing ingress cache method of the second embodiment of the present invention is shown in FIG. 6. This embodiment is well suited for load sharing applications whereby the default path can be used to relieve congestion that arises on the shortcut VCC. At a later time, as the traffic rate permits, any flows previously diverted over the default path can be re-directed to the shortcut VCC. In addition, each individual flow can be assigned a priority that can be used in determining which flows are to be diverted ahead of other flows or perhaps not at all. Thus, the available bandwidth on the shortcut VCC is prioritized among the flows that are forwarded over the shortcut.

With reference to FIGS. 5 and 6, each flow is first assigned a priority by the MPC (step 80). The priority value is stored in the flow priority field 78 in the ingress MPC cache table 70. For example, flow priority values may range from 0 through 9 with 0 indicating to use the default path and 1 though 9 indicating to use the shortcut path but while giving preference to higher flow priority values.

At the time a flow is to be routed over a shortcut, the level of congestion over the shortcut VCC and over the default path is determined (step 82). The path to route the flow over is then determined based on the congestion rate and the flow priority level previously assigned (step 84). The flow priority is read from the flow priority field in the ingress MPC cache table.

Utilizing the desired algorithm it is determined whether to route each flow over the default path or the shortcut path (step 86). The algorithm used can give more or less weight to the flow priority and the level of congestion to achieve the desired performance characteristics. If the decision algorithm decides upon the default path, the flow is then routed over the default path (step 88). Conversely, if the decision algorithm decides upon the shortcut path, the flow is then routed over the shortcut VCC (step 89).

Figure 7:
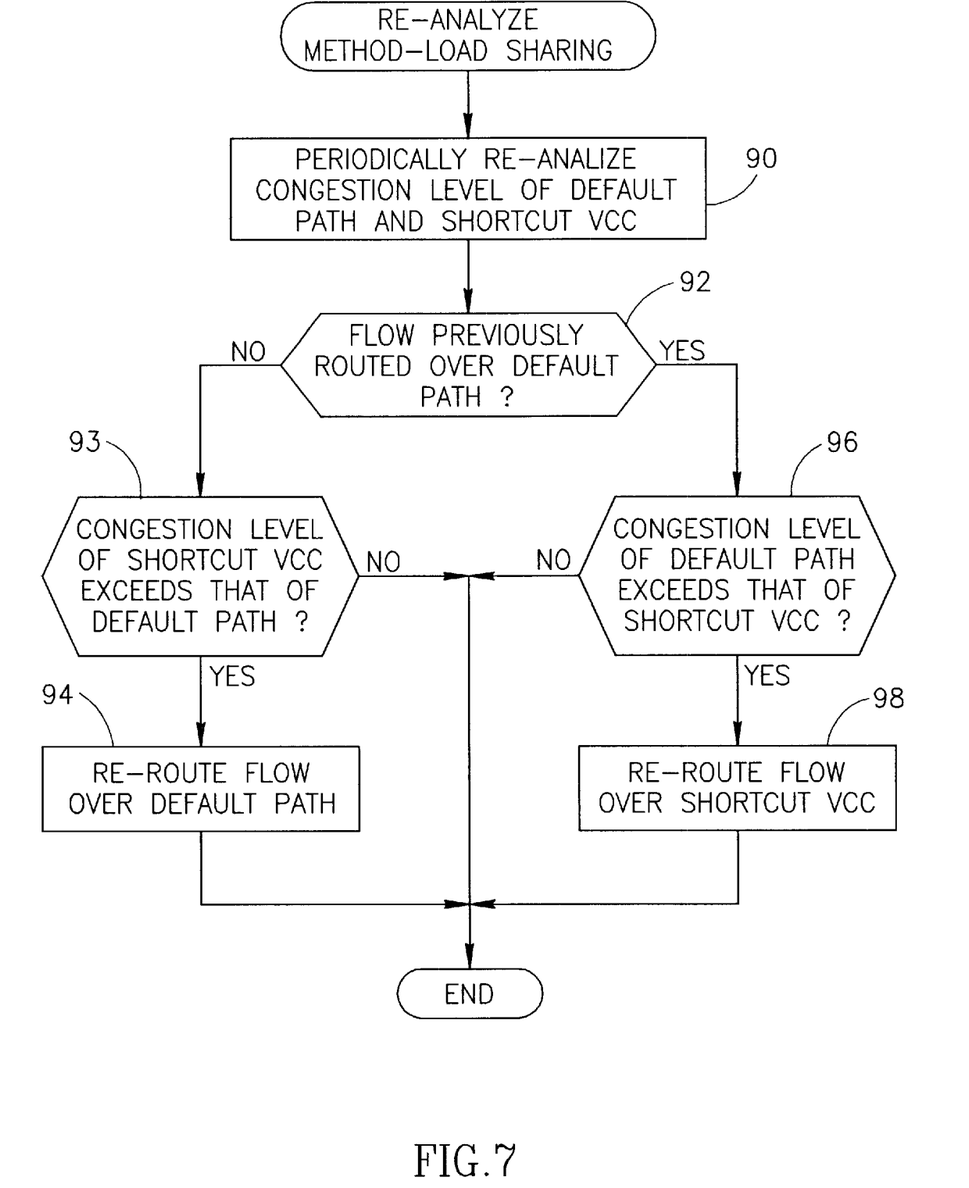
FIG. 7 is a flow diagram illustrating the re-analysis portion of the load sharing ingress cache method of the second embodiment of the present invention.

The method of the invention also provides a mechanism to periodically re-analyze the congestion level of the default and shortcut paths. A flow diagram illustrating the re-analysis portion of the load sharing ingress cache method of the second embodiment of the present invention is shown in FIG. 7. The congestion level of the default path and the shortcut VCC is periodically re-analyzed (step 90). If the flow was previously routed over the default path (step 92), then it is checked whether the congestion level of the default path exceeds a given congestion level, for example the congestion level of the shortcut VCC (step 96). If so, the flow is re-routed over the shortcut VCC (step 98).

If the flow was previously routed over the shortcut VCC (step 92), then it is checked whether the congestion level of the shortcut VCC now exceeds a given congestion level, for example the congestion level of the default path (step 93). If it does, then the flow is re-routed over the default path (step 94).

Third Method—Failure Learning

Figure 8:
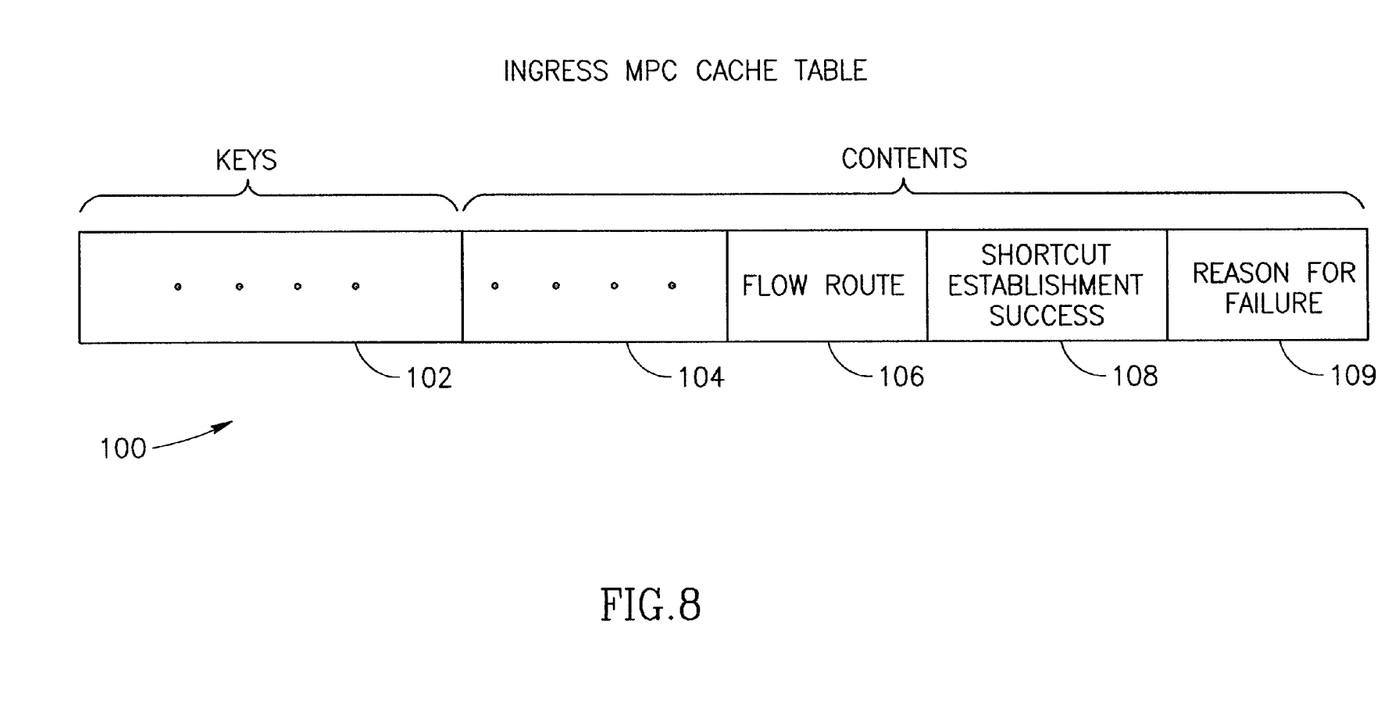
FIG. 8 is a diagram illustrating the structure of the ingress MPOA Client cache table of a third embodiment of the present invention.

A diagram illustrating the structure of the ingress MPOA Client cache table of a third embodiment of the present invention is shown in FIG. 8. The ingress cache table comprises the standard ingress cache table, generally referenced 100, as described in the MPOA standard specification including both key fields 102 and content fields 104 described above in connection with FIG. 2. In addition, the following fields are added to the table: (1) a flow route field 106 to indicate whether the flow is to be routed over the default path or the shortcut path, (2) a shortcut establishment success field 108 to indicate the success or failure of the establishment of the shortcut VCC and (3) a failure reason field 109 to indicate, in the event of failure, the reason for the failure. The failure reason field may comprise a code indicating the reason for failure. The failure reason field is optional but is useful in applications where it is desirable to know why the attempt to establish the shortcut VCC failed.

Figure 9:
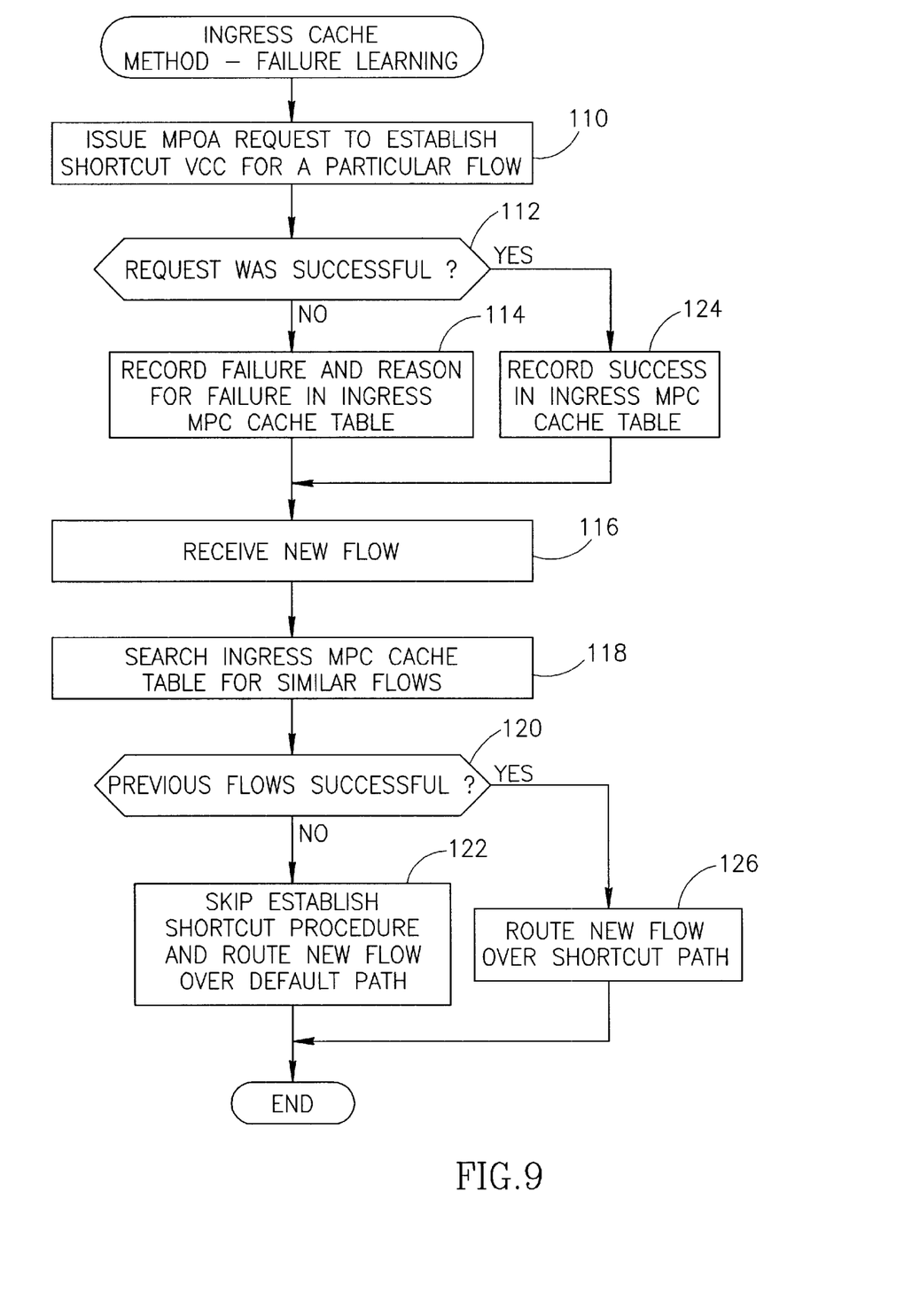
FIG. 9 is a flow diagram illustrating the failure learning ingress cache method of the third embodiment of the present invention.

A flow diagram illustrating the failure learning ingress cache method of the third embodiment of the present invention is shown in FIG. 9. This embodiment is well suited in applications wherein it is desirable that the MPC learn from previous failed attempts at establishing shortcut VCCs. Using the indications stored in the ingress MPC cache table, current attempts at establishing a shortcut VCC can 'learn' from previous establishment attempts. If previous attempts at establishing the shortcut VCC were unsuccessful, than the current flow can be routed over the default path in anticipation of the current attempt failing, without the need to perform the time consuming shortcut VCC establishment process.

With reference to FIGS. 8 and 9, at some point in time the MPOA Client issues a request to establish a shortcut VCC for a particular flow (step 110). The result of the flow is then stored in the ingress MPC cache table. If the establishment of the shortcut VCC was successful (step 112), the success is recorded in the shortcut establishment success field 108 in the ingress MPC cache table 100 (step 124). On the other hand, if the establishment of the shortcut VCC was unsuccessful, the failure is recorded in the shortcut establishment success field 108 (step 114). Optionally,. the reason for the failure is also recorded in the failure reason field 109. The failure reason can be stored as a code to indicate the type of failure. Example reasons for failure to establish the shortcut VCC include, but are not limited to, lack of resources including: insufficient resources to accept the egress cache entry, insufficient resources to accept a shortcut, insufficient resources to accept either shortcut or egress cache entry or unsupported Internetwork Layer protocol. The failure reason codes may comprise the error codes listed in Section 5.3.1 of the MPOA standard specification. These codes are listed below in Table 1.

TABLE 1

MPOA CIE Codes

| Code | Description |
|---|---|
| 0x00 | Success |
| 0x81 | Insufficient resources to accept egress cache entry |
| 0x82 | Insufficient resources to accept shortcut |
| 0x83 | Insufficient resources to accept either shortcut or egress cache entry |
| 0x84 | Unsupported Internetwork Layer protocol |
| 0x85 | Unsupported MAC layer encapsulation |
| 0x86 | Not an MPC |
| 0x87 | Not an MPS |
| 0x88 | Unspecified/Other |

When a new flow request arrives (step 116), the ingress MPC cache table is searched for flows 'similar' to the current flow to be routed (step 118). In particular, the ingress MPC cache is searched for common elements of the flows that it has already processed. The shortcut establishment success fields of the flows are examined and if previous flows were successful (step 120), the current flow will be routed over the shortcut VCC, i.e., the I-MPC starts the MPOA process of establishing a shortcut VCC (step 126).

Conversely, if the establishment of previous flows having elements in common with the current flow were largely unsuccessful, the shortcut establishment procedure is skipped and the current flow is routed over the default path (step 122). In this fashion, the old (previous) flows processed by an MPOA Client are used to effect the routing of new flows that are to be routed. This results in considerable time savings whereby the time consuming process of trying to establish a new shortcut VCC that is bound to fail can be avoided. More specifically, the prior art process comprises, for each flow, the Ingress MPOA Client calculating the traffic threshold, negotiating through the MPOA CTL resolution request and response procedure (including any potential retries) and the establishment or use of an existing shortcut.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. In an Asynchronous Transfer Mode (ATM) based Multiple Protocol Over ATM (MPOA) network running LAN Emulation (LE) and having an ingress MPOA Client (I-MPC), ingress MPOA Server (I-MPS), egress MPS (E-MPS) and an egress MPC (E-MPC), a method of establishing a data flow from a source to a destination, said method comprising the steps of:

establishing a data path from said source to said destination via a default path established between said I-MPC, said I-MPS, said E-MPS and said E-MPC;

establishing a data path from said source to said destination via a shortcut path established directly between said I-MPC and said E-MPC;

providing a flow route field for indicating whether said flow is to be routed through said default path or said shortcut path; and routing said flow over said default path or said shortcut path in accordance with the contents of said flow route field.

2. The method according to claim 1, wherein said flow route field is appended to an ingress cache table within said I-MPC.

3. In an Asynchronous Transfer Mode (ATM) based Multiple Protocol Over ATM (MPOA) network running LAN Emulation (LE) and having an ingress MPOA Client (I-MPC), ingress MPOA Server (I-MPS), egress MPS (E-MPS) and an egress MPC (E-MPC), a method of controlling the routing of a data flow from a source to a destination, said method comprising the steps of:

establishing a data path from said source to said destination via a default path established between said I-MPC, said I-MPS, said E-MPS and said E-MPC;

establishing a data path from said source to said destination via a shortcut path established directly between said I-MPC and said E-MPC;

providing a security field for indicating whether said flow is permitted to be routed via said shortcut path rather than said default path; and routing said flow over said default path or said shortcut path in accordance with the contents of said security field.

4. The method according to claim 3, wherein said security field is appended to an ingress cache table within said I-MPC.

5. In an Asynchronous Transfer Mode (ATM) based Multiple Protocol Over ATM (MPOA) network running LAN Emulation (LE) and having an ingress MPOA Client (I-MPC), ingress MPOA Server (I-MPS), egress MPS (E-MPS) and an egress MPC (E-MPC), a method of load sharing a plurality of data flows, said method comprising the steps of:

establishing a data path from a source to a destination via a default path established between said I-MPC, said I-MPS, said E-MPS and said E-MPC;

establishing a data path from said source to said destination via a shortcut path established directly between said I-MPC and said E-MPC;

providing a flow route field for indicating whether said flow is to be routed over said default path or said shortcut path;

providing a flow priority field for indicating the level of priority assigned to said flow;

determining whether said flow is to be routed via said default path or said shortcut path in accordance with the level of congestion on said default path and said shortcut path and with the value of said flow priority field associated with said flow; and routing said flow over said default path or said shortcut path in accordance with the results of said step of determining.

6. The method according to claim 5, wherein said flow route field is appended to an ingress cache table within said I-MPC.

7. The method according to claim 5, wherein said flow priority field is appended to an ingress cache table within said I-MPC.

8. The method according to claim 5, further comprising the steps of:

periodically re-analyzing the congestion level of said default path and said shortcut path; and re-directing a flow previously routed over said default path to said shortcut path in the event said conditions permit said redirection.

9. The method according to claim 5, further comprising the steps of:

periodically re-analyzing the congestion level of said default path and said shortcut path; and re-directing a flow previously routed over said shortcut path to said default path in the event said conditions warrant said redirection.

10. In an Asynchronous Transfer Mode (ATM) based Multiple Protocol Over ATM (MPOA) network running LAN Emulation (LE) and having an ingress MPOA Client (I-MPC), ingress MPOA Server (I-MPS), egress MPS (E-MPS) and an egress MPC (E-MPC), a method of learning about past MPOA resolution successes and failures, said method comprising the steps of:

establishing a data path from said source to said destination via a default path established between said I-MPC, said I-MPS, said E-MPS and said E-MPC;

establishing a data path from said source to said destination via a shortcut path established directly between said I-MPC and said E-MPC;

providing a flow route field for indicating whether said flow is to be routed over said default path or said shortcut path;

providing a success field for indicating whether the establishment of an MPOA shortcut route was successful or not for this particular flow;

determining whether the current flow is to be routed over said shortcut route or said default route in accordance with the shortcut establishment successes and failures of one or more previous flows; and routing said flow over said default path or said shortcut path in accordance with the results of said step of determining.

11. The method according to claim 10, wherein said flow route field is appended to an ingress cache table within said I-MPC.

12. The method according to claim 10, wherein said success field is appended to an ingress cache table within said I-MPC.

13. The method according to claim 10, further comprising the steps of providing a failure reason field for indicating a reason for failure in the event said shortcut route could not be established.

14. The method according to claim 13, wherein said failure reason field is appended to an ingress cache table within said I-MPC.

15. In an ingress Multiple Protocol Over ATM (MPOA) Client (I-MPC) device, a method of controlling the routing of a data flow from a source to a destination, said method comprising the steps of:

implementing the client side of the MPOA protocol;

providing an ingress cache table comprising a flow route field for indicating whether a flow is to be routed over a default path or a shortcut path; and determining whether a flow is to be routed via said default path or said shortcut path and for setting said flow route field in accordance thereto; and routing said flow in accordance with said flow route field.

16. In an ingress Multiple Protocol Over ATM (MPOA) Client (I-MPC) device, a method of load sharing a plurality of data flows, said method comprising the steps of:

implementing the client side of the MPOA protocol;

providing an ingress cache table comprising a flow route field for indicating whether a flow is to be routed over a default path or a shortcut path;

determining the congestion level of said default path and said shortcut path;

determining, whether a flow is to be routed via said default path or said shortcut path based on said congestion level and for setting said flow route field in accordance thereto; and routing said flow in accordance with said flow route field.

17. The method according to claim 16, further comprising the step of re-analyzing the congestion level of said default path and said shortcut path and, if traffic conditions permit, redirecting a flow previously routed over said default path over said shortcut path.

18. The method according to claim 16, further comprising the step of re-analyzing the congestion level of said default path and said shortcut path and, if traffic conditions permit, redirecting a flow previously routed over said shortcut path over said default path.

19. In an ingress Multiple Protocol Over ATM (MPOA) Client (I-MPC) device, a method of load sharing a plurality of data flows, said method comprising the steps of:

implementing the client side of the MPOA protocol;

providing an ingress cache table comprising a flow route field for indicating whether a flow is to be routed over a default path or a shortcut path and a flow priority field for indicating the priority assigned to a flow;

determining the congestion level of said default path and said shortcut path;

determining, whether a flow is to be routed via said default path or said shortcut path based on said congestion level and for setting said flow route field in accordance thereto; and routing said flow in accordance with said flow route field.

20. The method according to claim 19, further comprising the step of re-analyzing the congestion level of said default path and said shortcut path and, if traffic conditions permit, redirecting a flow previously routed over said default path over said shortcut path.

21. The method according to claim 19, further comprising the step of re-analyzing the congestion level of said default path and said shortcut path and, if traffic conditions permit, redirecting a flow previously routed over said shortcut path over said default path.

22. In an ingress Multiple Protocol Over ATM (MPOA) Client (I-MPC) device, a method comprising the steps of:

implementing the client side of the MPOA protocol;

providing an ingress cache table comprising a flow route field for indicating whether a flow is to be routed over a default path or a shortcut path and an establishment success field for indicating the success or failure of the establishement attempt of a shortcut path;

storing the results of attempts to establish shortcut virtual circuits in said establishment success field of said ingress cache table;

searching said ingress cache table for similar flows upon said MPC means receiving a new flow;

determining, whether a flow is to be routed via said default path or said shortcut path based on said step of searching and for setting said flow route field in accordance thereto; and routing said flow in accordance with said flow route field.

23. The method according to claim 22, further comprising the step of providing a reason field in said ingress cache table for indicating the reason for failure in the event a shortcut virtual circuit cannot be established.

* * * * *